Patented Mar. 29, 1938

2,112,715

UNITED STATES PATENT OFFICE 2,112,715

HYDROGENATION OF HYDROFURAMIDE TO FURFURYLAMINE

Caryl Sly, Wilmington, Del., assignor to E. I. du Pont de Nemours & Company, Wilmington, Del., a corporation of Delaware No Drawing. Application December 20, 1935, Serial No. 55,409

7 Claims. (Cl. 260—54)

This invention relates to liquid phase catalytic hydrogenation, and more particularly to hydrogenation of the furfural-ammonia addition product known as hydrofuramide. This compound is recognized as having the following structural formula:

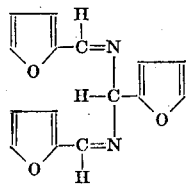

The art as regards the hydrogenation of aldehyde-ammonia compounds in general is voluminous, but references to hydrofuramide are rare. Winnans and Adkins J. A. C. S. 55, 2056, (1933), described the hydrogenation of hydrofuramide in an alcohol solvent with the formation of equal molar quantities of tetrahydrofurfurylamine (one part by weight) and ditetrahydrofurfurylamine (two parts by weight).

This invention has as its object the preparation of furfurylamine by the catalytic hydrogenation of hydrofuramide, in materially increased yields over the normal yield of 33% by weight. A still further object is the development of an efficient process for the production of furfurylamine. Other objects will appear hereinafter.

The above objects are accomplished by adding water and preferably water and ammonia to hydrofuramide dissolved in a suitable inert solvent and then hydrogenating with a base metal catalyst, preferably nickel under super-atmospheric pressure and at somewhat elevated temperatures. The preferred embodiments of this invention are set forth in the following examples.

Example 1

Seventy-five grams (0.28 mol.) of hydrofuramide, 75 grams (2.34 mols) of methanol, 35 grams (0.58 mol. of ammonia in 1.4 mols of water) of concentrated aqueous ammonia, and 8 grams of nickel catalyst were sealed in a pressure autoclave and heated to 80° to 100° C. with shaking. Hydrogen was admitted to the autoclave until the pressure was within the range of 1000 to 2000 pounds per square inch. Hydrogen was absorbed over a period of one to two hours and then stopped. The reaction mixture was discharged, the catalyst filtered out and the product distilled. After removal of the methanol 48.5 grams of furfurylamine, B. P. 143° to 146° C. per 760 mm. or 36° to 38° C. per 7 to 10 mm., was isolated. This quantity corresponds to a 60% yield of furfurylamine.

Example 2

Into a small autoclave were charged 75 grams (0.28 mols) of hydrofuramide, 75 grams (2.34 mols) of methanol, 15 grams (0.83 mol.) of water, 18 grams (1.06 mols) of liquid ammonia, and 8 grams of a nickel catalyst. While shaking, the contents were heated to 80—100° C., and then hydrogen was admitted under pressure until a total pressure of 1000 to 2000 pounds per square inch was reached. After the hydrogen absorption was complete, the product was discharged from the autoclave, filtered to remove catalyst and distilled. There was obtained 36 grams (0.37 mol.) of furfurylamine, B. P. 143° to 146° C., which amounts to a 44% yield.

In the above examples certain preferred conditions were indicated as regards pressure, temperature, solvent, catalyst, etc., which may be varied within the scope of this invention. The pressure of hydrogen used may vary from 20 to 200 atmospheres and the temperature from 50° to 200° C. In fact, if the temperature is gradually raised from 100° C. to 150°—175° C., after the initial hydrogen absorption has been completed, a considerable portion of the furfurylamine will be converted to the tetrahydro derivative.

The addition of water is necessary since in runs to which only anhydrous ammonia was added no hydrogen was absorbed, even at 125° C. The reaction may be carried out in the presence of water alone but it is preferred to carry out the reaction in the presence of both water and ammonia. To obtain the best results the amount of water present should generally be in an amount not less than about half a mol. of water per mol. of hydrofuramide to be hydrogenated, and it is preferable to have the water present in an amount equal to three to five mols of water for each mol. of hydrofuramide. As it appears that the ammonia both supplies nitrogen for the reaction, as well as prevents the formation of difurfurylamine by the elimination of ammonia from two mols of furfurylamine, it is preferred to have ammonia present, together with the water. The preferred amount of ammonia is at least one mol. of ammonia per mol. of hydrofuramide but an amount as high as five to ten mols of ammonia can be used.

Since at its melting point hydrofuramide changes quite rapidly to the isomeric furfurin which does not hydrogenate to furfurylamine, the use of a solvent is preferred. Methanol has been used in my experiments but other solvents such as ethanol, isopropanol, dioxane, etc., can be used. All of these solvents are miscible with water and are, for that reason, indicated, but any solvent for hydrofuramide may be used satisfactorily.

As indicated in the examples, I prefer to use as catalysts metallic nickel, massive or supported on such materials as kieselguhr and silica gel. Nevertheless other base metal hydrogenation catalysts such as cobalt, nickel chromite, copper chromite, etc., may be used under correct conditions of temperature and pressure. The time required for hydrogenation will depend upon the activity of the catalyst, temperature. etc., but normally will require from one to three hours.

By means of this invention the yield of furfurylamine from hydrofuramide dissolved in a solvent amounts to 50-60% by weight as compared with previously reported yields of 33%.

As many apparently widely different embodiments of this invention may be made without departing from the spirit and scope thereof, it is to be understood that this invention is not intended to be limited except as indicated in the appended claims.

I claim:

1. In a process for the catalytic hydrogenation of hydrofuramide to furfurylamine, the improvement which comprises carrying out the reaction in the presence of at least one mol. of ammonia per mol. of hydrofuramide and at least one half mol. of water for each mol. of hydrofuramide, at a temperature of from 50° to 200° C. and at a pressure between 20 and 200 atmospheres, in the presence of a base metal hydrogenation catalyst.

2. The process which comprises reacting hydrofuramide, while in solution in a solvent, with hydrogen at a temperature within the range of 50° to 200° C. and at a superatmospheric pressure in the presence of a base metal hydrogenation catalyst and in the presence of water and ammonia in an amount equivalent to at least 0.5 mol. of water and at least one mol. of ammonia per mol. of hydrofuramide.

3. The process in accordance with claim 2 characterized in that the base metal hydrogenation catalyst is nickel.

4. The process in accordance with claim 2 characterized in that the reaction is carried out at a pressure of about 2200 pounds per square inch.

5. The process in accordance with claim 2 characterized in that the reaction is carried out at a temperature of about 80° to about 100° C.

6. The process which comprises reacting hydrofuramide, while in solution in a solvent, with hydrogen at a temperature of about 80° to about 100° C. and at a pressure of about 1000 to about 2000 pounds per square inch in the presence of a nickel catalyst and in the presence of water and ammonia in amount equal to at least 0.5 mol. of water and at least one mol. of ammonia per mol. of hydrofuramide.

7. The process in accordance with claim 6 characterized in that the hydrofuramide is in solution in methanol and the water is present in an amount equivalent to 3 to 5 mols of water per mol. of hydrofuramide.

CARYL SLY.